No. 745,376. PATENTED DEC. 1, 1903.
G. C. PARISH.
BROILER.
APPLICATION FILED JULY 28, 1902.

NO MODEL.

Witnesses
Graham C. Parish, Inventor
By his Attorney
Nathaniel L. Frothingham.

No. 745,376. Patented December 1, 1903.

UNITED STATES PATENT OFFICE.

GRAHAM C. PARISH, OF KINGSTON, NEW YORK, ASSIGNOR TO THE W. G. BROWNE MANUFACTURING COMPANY, OF KINGSTON, NEW YORK, A CORPORATION OF NEW YORK.

BROILER.

SPECIFICATION forming part of Letters Patent No. 745,376, dated December 1, 1903.

Application filed July 28, 1902. Serial No. 117,413. (No model.)

*To all whom it may concern:*

Be it known that I, GRAHAM C. PARISH, a citizen of the United States, residing at Kingston, in the county of Ulster and State of New York, have invented certain new and useful Improvements in Broilers, of which the following is a specification, reference being had therein to the accompanying drawings.

My invention relates to broilers, and more particularly to that class of broilers employing an upper and a lower gridiron adapted to receive food between the bars thereof and wherein said gridirons are capable of being reversed independently of the handle.

The object of my invention is to provide a broiler of the aforesaid type so constructed and arranged that the gridirons will be capable of and limited to a complete reversal only, such as will serve to successively expose the respective gridirons to the fire without the necessity of the use of independently-operated mechanism to permit and to arrest the rotary movement of the gridirons.

A further object is to provide a broiler wherein the said irons may be freely and readily turned by a slight movement of the wrist of the cook.

A still further object is to provide a broiler the bars of the gridirons of which will prevent food contained therebetween from escaping.

A still further object is to provide a handle with means whereby it may be rested upon a stove-top to enable the gridirons to be brought into close proximity to the bed of embers or coals or to be inserted beneath said top through one of the stove-openings to more evenly and perfectly cook the food and to minimize the discomforts otherwise resulting to the cook.

It is also an object of my invention to provide a broiler having the aforesaid capabilities which will be comparatively inexpensive to manufacture, which will be durable in use, and which will be simple and efficient in its construction and mode of operation.

The invention consists in providing a broiler wherein the gridirons are capable of reversal independently of the handle, wherein the means for arresting the rotation thereof in each direction do not interfere with the free reversal of said gridirons, wherein said gridirons are so balanced in relation to their supports as to facilitate this reversal, and in such other novel features of construction and arrangement of parts as are hereinafter set forth and described, and more particularly pointed out in the claims hereto appended.

Figure 1:
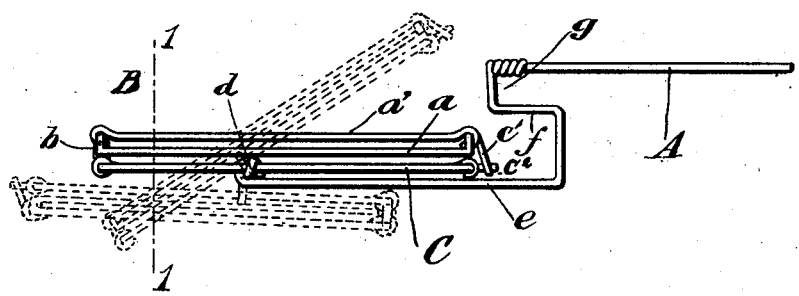
Figure 2:
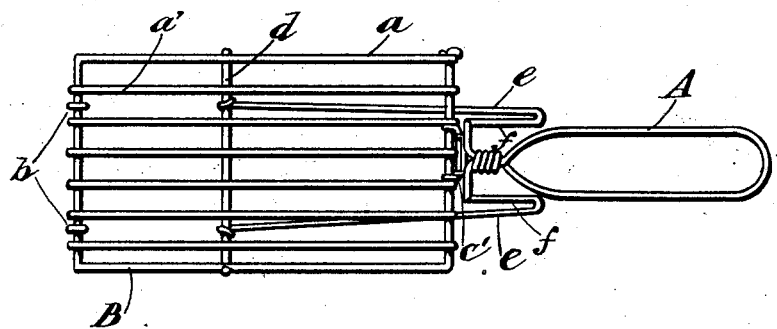
Figure 3:

Referring to the drawings, Figure 1 is a side view of a broiler on a reduced scale embodying my invention, the position of the gridirons before and during the reversal thereof being indicated in dotted lines. Fig. 2 is a top view of the broiler as shown in full lines of Fig. 1; and Fig. 3 is a view on the line 1 1 of Fig. 1, but on a larger scale.

Like letters refer to like parts throughout the several views.

My broiler comprises a handle A and gridirons B and C, which latter are hinged together, as at $b$, by means of ordinary S-links, so as to be capable of a slight separation to better accommodate meats and other foods between them. A latch $c$, comprising a movable link $c'$ and a stationary loop $c^2$, secures said gridirons when in use and prevents accidental separation of same when they are being reversed. Each gridiron consists of an outer frame, as $a$, to which are attached the bars $a'$. These parts are preferably made of stiff wire and secured together by bending solely, although soldering or other well-known expedients may be employed, if desired. To obstruct the usual free space between the side of the frames of the respective gridirons, and thus prevent the escape of matter not gripped by the bars, the sides of one or both of the said frames $a$ are dropped out of alinement with the bars $a'$, as more clearly shown in Fig. 3.

The handle A comprises the ordinary gripping area, which, however, is on a higher plane than the gridirons and carries a frame, preferably made integral therewith, which is extended downwardly and outwardly to form bearings for the independently-reversible gridirons. This frame is composed of separate strands of wire bent to form the outwardly-projected arms e e and about midway between said arms and said handle a shoulder f, forming recesses between it and said arms and between it and said handle, by means of which recesses the broiler may be more conveniently held or sustained in relation to the bed of embers or coals. The outer ends of said arms e e are formed into bearings, in which is mounted the cross-bar d, carried by one of the gridirons. These arms are disposed within the path of said gridirons as they are reversed, so that one end of said irons will always be in engagement with and rest upon or against same to limit the movement thereof to a single reversal and also insure the proper stability when in use. The bar d or its equivalent utilized to form the pivotal connection between the frame carried by the handle and said gridirons is arranged nearer one end of said irons than the other, so that said irons are eccentrically mounted in relation to the handle A and will be so overbalanced that it will operate as hereinafter described.

All parts of the broiler are preferably made of stiff wire bent to the required configuration and to form the necessary unions; but it is apparent that other methods may be employed, if desired.

In the operation of my broiler meat or other food is placed between the gridirons B and C in the usual manner after the bars have been properly greased or chalked, and said bars are secured together when closed by means of the latch c, the link c' of which passes over the loop c². No matter so contained is permitted to escape, even if not properly engaged by the bars a', as the sides of the frame or frames a practically close the space at the sides of said gridirons. The broiler is then turned so that the short end is in engagement with the lower side of the arms e e, as shown in dotted lines, Fig. 1. The said gridirons being eccentrically mounted on said arms, the weight beyond the bar d or other pivotal point holds them in this position. When it is desired to bring the gridirons and contents close to the bed of embers or coals and substantially parallel therewith to insure a uniform action of the heat thereupon, the recess between the arms e e and shoulder f or recess g between said shoulder and the handle is utilized to bring said shoulder or said handle into engagement with the top of the stove, thus relieving the cook of the necessity of holding the broiler in this position, which is uncomfortable, if not impossible. To turn the broiler, it is merely necessary to "flip" the handle upward by a quick movement of the wrist. The excess of weight beyond the pivotal point receives sufficient momentum by this motion to overbalance the gridirons, as shown in dotted lines, Fig. 1, and also to cause it to fall toward the cook and drop and rest upon the arms e e, as shown in full lines in said figure. The excess weight beyond the pivotal point, it will be observed, holds one end of the gridirons constantly in engagement with the arms e e, which are disposed directly within its path in turning both before and after turning, so that no complicated or independently-operated catch is required to prevent the said irons from turning partially owing to an uneven distribution of their contents or which will interfere with the free reversal of said gridirons when desired. The arms e e serve a double function. They carry the bearings for the gridirons and form a rest which arrests their movement in either direction. Owing to the said irons being eccentrically mounted they must engage constantly with said arms except in turning, so that while capable of being quickly and smoothly turned they are to all intents and purposes as stable as the ordinary broiler in which the gridirons and handles are made integral.

I am aware that it is not new to provide a broiler wherein the gridirons turn independently of the handle, and it is not my intention to claim such broadly; but I do not intend to hereby limit my invention to the precise construction shown and described, as it is apparent that the details of construction may be varied indefinitely and still be within the scope and spirit of my invention.

Having described my invention, what I claim, and desire to have protected by Letters Patent, is—

1. In a broiler, the combination of a handle, a frame carried thereby comprising a plurality of outwardly-projected arms, a bearing on the outer end of each arm, gridirons, laterally-extended journals on said gridirons mounted in said bearings whereby said gridirons are rendered reversible independently of said handle, said arms being disposed within the path of said gridirons whereby the rotary movement thereof in each direction is arrested and a firm rest for either end thereof is provided.

2. In a broiler, the combination of a handle, a frame carried thereby comprising a plurality of outwardly-projected arms, a bearing on the outer end of each said arm, gridirons and laterally-extended journals arranged eccentrically of said gridirons and mounted in said bearings whereby said gridirons are rendered reversible independently of said handle, said arms being disposed within the path of said gridirons whereby the rotary movement thereof in each direction is arrested and a firm rest for either end thereof is provided.

3. In a broiler, the combination with a pair of gridirons comprising respectively an outer frame and parallel bars carried thereby, said frames on opposite sides being dropped out of alinement with said bars, a hinged connection between said gridirons, a catch for securing said gridirons temporarily together, a handle, a frame carried thereby comprising a plurality of outwardly-projected arms, a bearing on the outer end of each said arm and laterally-extended journals arranged eccentrically on said gridirons mounted in said bearings whereby said gridirons are rendered reversible independently of said handle, said arms being disposed within the path of said gridirons whereby the rotary movement thereof is arrested in each direction and a firm rest for either end thereon is provided.

4. In a broiler, the combination with gridirons and a handle disposed on relatively different planes, of a frame forming a part of the handle, a shoulder intermediate said gridirons and said handle forming recesses between said shoulder and said gridirons and between said shoulder and said handle whereby the broiler may be sustained by the top of the stove, arms carried by said frame and bearings thereon, said gridirons being mounted in said bearings and reversible independently of said handle, and said arms being disposed within the path of said gridirons whereby the rotary movement thereof is arrested in each direction.

In witness whereof I have hereunto affixed my signature, this 18th day of July, 1902, in the presence of witnesses.

GRAHAM C. PARISH.

Witnesses:
 REUBEN BERNARD,
 EVERETT FOWLER,
 WM. T. VAN BUREN.